United States Patent
Apte et al.

(10) Patent No.: US 12,481,594 B2
(45) Date of Patent: Nov. 25, 2025

(54) DYNAMICALLY ALTERING TRACKING GRANULARITY IN A REGION-BASED CACHE DIRECTORY

(71) Applicant: Advanced Micro Devices, Inc., Santa Clara, CA (US)

(72) Inventors: Amit Apte, Austin, TX (US); Ganesh Balakrishnan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 608 days.

(21) Appl. No.: 17/958,179

(22) Filed: Sep. 30, 2022

(65) Prior Publication Data
US 2024/0111683 A1    Apr. 4, 2024

(51) Int. Cl.
*G06F 12/08* (2016.01)
*G06F 12/0895* (2016.01)

(52) U.S. Cl.
CPC ...... *G06F 12/0895* (2013.01); *G06F 2212/60* (2013.01)

(58) Field of Classification Search
CPC ............ G06F 12/0895; G06F 12/0817; G06F 12/128; G06F 12/0811; G06F 12/0871; G06F 12/0831; G06F 2212/283; G06F 2212/621; G06F 2212/604; G06F 2212/60
See application file for complete search history.

(56) References Cited

U.S. PATENT DOCUMENTS

| | | | |
|---|---|---|---|
| 2005/0033919 A1* | 2/2005 | Borkenhagen | G06F 12/082 711/146 |
| 2008/0133875 A1 | 6/2008 | Cohen et al. | |
| 2014/0156940 A1 | 6/2014 | Weiner | |
| 2014/0181410 A1 | 6/2014 | Kalamatianos et al. | |
| 2015/0212947 A1 | 7/2015 | Henry et al. | |
| 2019/0050333 A1* | 2/2019 | Chacon | G06F 12/084 |
| 2019/0188137 A1* | 6/2019 | Kalyanasundharam | G06F 12/128 |
| 2020/0065246 A1* | 2/2020 | Boyer | G06F 12/0842 |
| 2021/0050333 A1* | 2/2021 | Lin | H01L 25/0753 |
| 2021/0157725 A1 | 5/2021 | Barbalho et al. | |

FOREIGN PATENT DOCUMENTS

| | | | | |
|---|---|---|---|---|
| EP | 3001308 B1 | * | 12/2017 | ... G06F 9/38 |
| TW | 1506552 B | * | 11/2015 | ... G06F 9/14 |
| WO | 2024073185 A1 | | 4/2024 | |

OTHER PUBLICATIONS

PCT/US2023/071862, "International Seach Report and Written Opinion", PCT Application No. PCT/US2023/071862, Dec. 4, 2023, 6 pages.

* cited by examiner

*Primary Examiner* — Tracy C Chan
(74) *Attorney, Agent, or Firm* — FIG. 1 Patents

(57) ABSTRACT

A method includes, in a cache directory, storing a set of entries corresponding to one or more memory regions having a first region size when the cache directory is in a first configuration, and based on a workload sparsity metric, reconfiguring the cache directory to a second configuration. In the second configuration, each entry in the set of entries corresponds to a memory region having a second region size.

20 Claims, 5 Drawing Sheets

DYNAMICALLY ALTERING TRACKING GRANULARITY IN A REGION-BASED CACHE DIRECTORY

BACKGROUND

Modern computing systems have multiple central processing units (CPUs) that typically include and rely on multiple caches in a cache hierarchy to improve processor and memory performance. Compared to main memory, a cache is a smaller and faster memory device that stores data that is frequently accessed so the data may be accessed with low latency. Such cache devices are often implemented in static random access memory (SRAM) and are typically located between a processing unit that issues memory requests and the main memory device. A memory-side cache is a dedicated cache attached to a particular memory device or partition of memory that caches data being written to and read from the memory device by other devices.

In multi-node computer systems, special precautions must be taken to maintain coherency of data that is being used by different processing nodes. For example, if a processor attempts to access data at a certain memory address, it must first determine whether the data is stored in another cache and has been modified. To implement this cache coherency protocol, caches typically contain multiple status bits to indicate the status of the cache line to maintain data coherency throughout the system. One common coherency protocol, for example, is the "MOESI" protocol, where each letter represents a state of the cache line. These states are as follows: the cache line has been modified (M), that the cache line is exclusive (E) or shared (S), or that the cache line is invalid (I). The owned (O) state indicates that the line is modified in one cache, that there may be shared copies in other caches, and that the data in memory is stale. Each cache line includes status bits in a cache directory, which keeps track of the cache lines that are currently in use by the system, to indicate which MOESI state the line is in.

Managing a cache directory scheme in a multiprocessor system can be difficult due to the various types of processing demands and the increase in cache and main memory sizes.

BRIEF DESCRIPTION OF THE DRAWINGS

The implementations illustrated in the figures of the accompanying drawings herein are by way of example and not by way of limitation. In the drawings.

DETAILED DESCRIPTION

Figure 1:
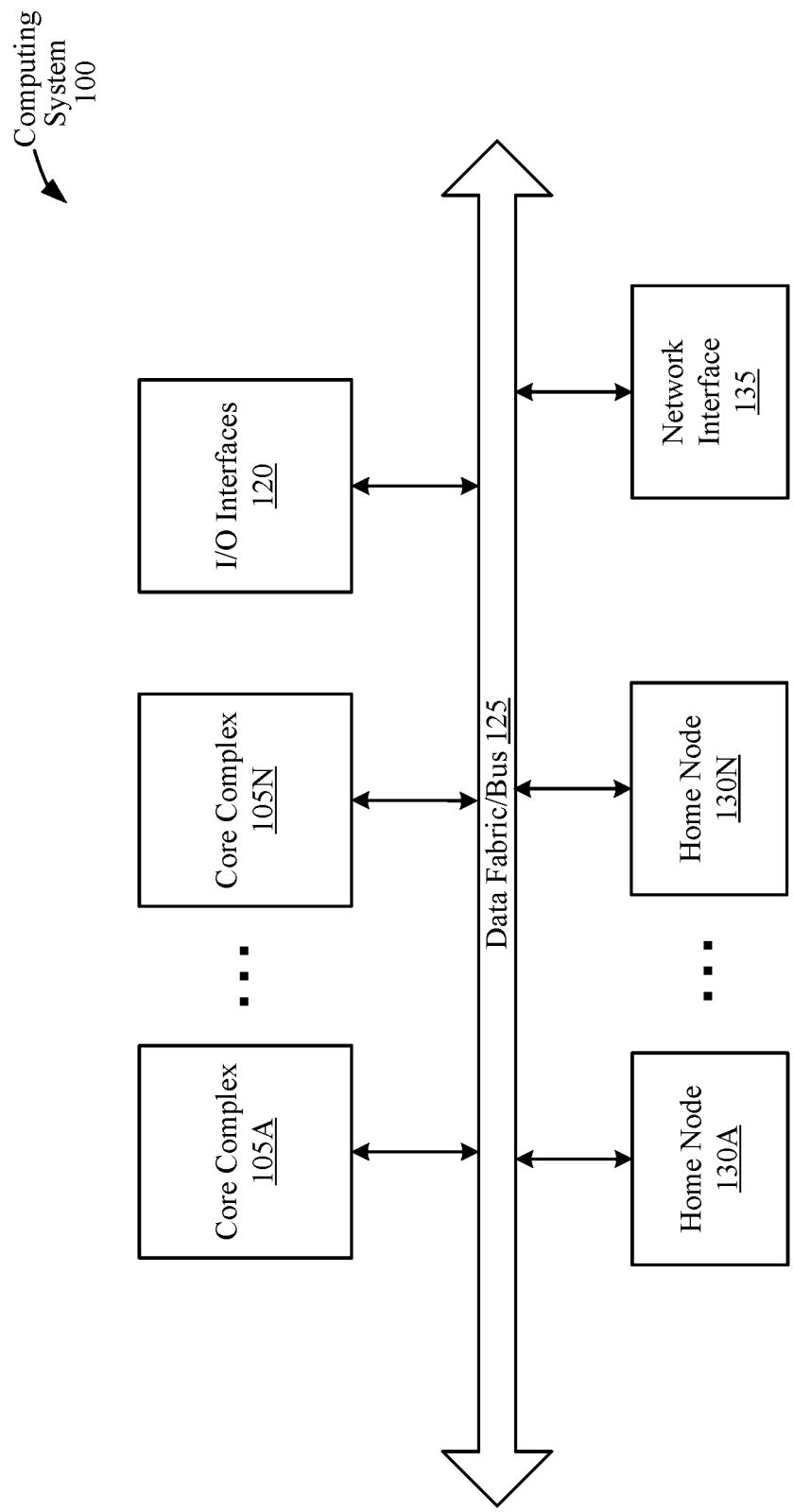
FIG. 1 is a block diagram of one implementation of a computing system.

The following description sets forth numerous specific details such as examples of specific systems, components, methods, and so forth, in order to provide a good understanding of the implementations. It will be apparent to one skilled in the art, however, that at least some implementations may be practiced without these specific details. In other instances, well-known components or methods are not described in detail or are presented in a simple block diagram format in order to avoid unnecessarily obscuring the implementations. Thus, the specific details set forth are merely exemplary. Particular implementations may vary from these exemplary details and still be contemplated to be within the scope of the implementations.

As the number of CPUs, respective caches and cache sizes grows larger, the cache directories also scale up to cover a larger number of entries. In some implementations, the cache directory is accessed on a per cache line basis to figure out where exactly the line has been cached in the system and the line's current coherency state so that snoops can be correctly filtered out as requests are received. In one implementation, to reduce the amount of chip area the cache directory consumes, the cache directory tracks regions of memory corresponding to groups of cache lines in the system instead of a single cache line. Coherency states are recorded and decisions are made collectively for the entire group of cache lines in the region. An aggregate reference count (ARC) is maintained that tracks the number of lines from the region that have a copy cached in one of the caches. The ARC is increased when a line from the region is cached, and is decremented when a line from the region is evicted from one of the caches. When the ARC for a region reaches zero, then there are no more lines from the region that are cached in any core complexes, so the region's entry in the cache directory can be invalidated and its space reclaimed.

In one implementation, the size of the region tracked by each entry in the cache directory can be changed during operation of the computing system. However, the optimal region size for maximizing performance can depend on the type of workload being executed. If the region size is too large, then excess false sharing can occur, in which two different lines in the same region are being accessed by different core complexes. In this case, the lines are not actually shared, but are treated as shared because of the lack of per-line tracking fidelity. This leads to additional coherency probes being sent on the system interconnect, which can cause congestion and degrade performance.

A smaller region size can reduce false sharing, since smaller region sizes can track the cached lines with greater accuracy. Compared to a cache directory using a larger region size, a cache directory using a smaller region size would use a greater number of entries to track the same number of cache lines. However, since the capacity of the cache directory is limited, it may be unable to track a large number of small regions. This can lead to a high eviction rate of entries from the cache directory, and a lower hit rate in the caches for the lines of the evicted regions.

In one implementation of a cache directory, the region size tracked by each entry in the cache directory is increased and decreased dynamically during execution of a workload based on a workload sparsity metric. The sparsity of the workload is the workload's tendency to access a small number of noncontiguous memory lines spread out over a large range of memory addresses. Sparsity can thus be defined by the density of accesses to a particular memory region, or the number of unique cachelines accessed within a region. Thus, the workload sparsity metric is an operational metric that reflects the degree of sparsity of the workload. One such metric is the ratio of evictions to lookups of entries in the cache directory, which increases as the sparsity of the workload increases. When the workload sparsity increases (e.g., detected when the workload sparsity metric exceeds a threshold), the cache directory is reconfigured to track a larger region size per entry. When the workload sparsity decreases, the cache directory is reconfigured to track a smaller region size per entry. A sparse workload touches relatively few lines in each region, so an increased region size is more likely to include a greater number of accessed lines, thus decreasing the impact of the sparsity. Dynamic adjustment of the region size allows lines to be tracked with the highest accuracy (e.g., minimizing the amount of false sharing) for a particular workload with the available capacity of the cache directory.

FIG. 1 is a block diagram of one implementation of a computing system 100 in which a cache directory is implemented that dynamically reconfigures the size of the region of memory and the number cache lines tracked in each cache directory entry in response to changes in the sparsity of the workload being executed. Computing system 100 includes multiple core complexes 105A-N and multiple home nodes 130A-N. Computing system 100 also includes, input/output (I/O) interfaces 120, data fabric/bus 125, and network interface 135. In other implementations, computing system 100 may include other components and/or be arranged in other configurations.

In one implementation, each core complex 105A-N includes processing components, such as one or more processor cores or other specialized processing components. Each processor core within core complex 105A-N includes a cache subsystem with one or more levels of caches. In one implementation, the cache subsystem includes a shared cache connected to each core complex 105A-N (e.g., L3 cache 230 in FIG. 2). In some implementations, one or more core complexes 105A-N may include a data parallel processor with a highly parallel architecture, such as one or more of graphics processing units (GPUs), digital signal processors (DSPs), field programmable gate arrays (FPGAs), application specific integrated circuits (ASICs), and so forth. As used herein a "core complex" can also be referred to as a "processing node" or a "CPU" or "CPU complex".

In one implementation, home node(s) 130 may include one or more of a coherent slave, a cache directory, and a memory controller coupled to any number and type of memory devices (not shown). For example, the memory device(s) coupled to home node(s) 130 may include Dynamic Random Access Memory (DRAM), Static Random Access Memory (SRAM), NAND Flash memory, NOR flash memory, Ferroelectric Random Access Memory (FeRAM), or others.

I/O (input/output) interfaces 120 are representative of any number and type of I/O interfaces, for example but not limited to the various types of peripheral component interconnect (PCI) buses, gigabit Ethernet (GBE) bus, universal serial bus (USB), specialty processors (e.g., platform security processors, graphics processors), and system management logic. Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 can be a server, desktop computer, laptop, mobile device, game console, streaming device, wearable device, or any of various other types of computing systems or devices. The number, orientation, and type of components illustrated in computing system 100 is by way of example only and can vary from implementation to implementation based on application and system architecture.

Figure 2:
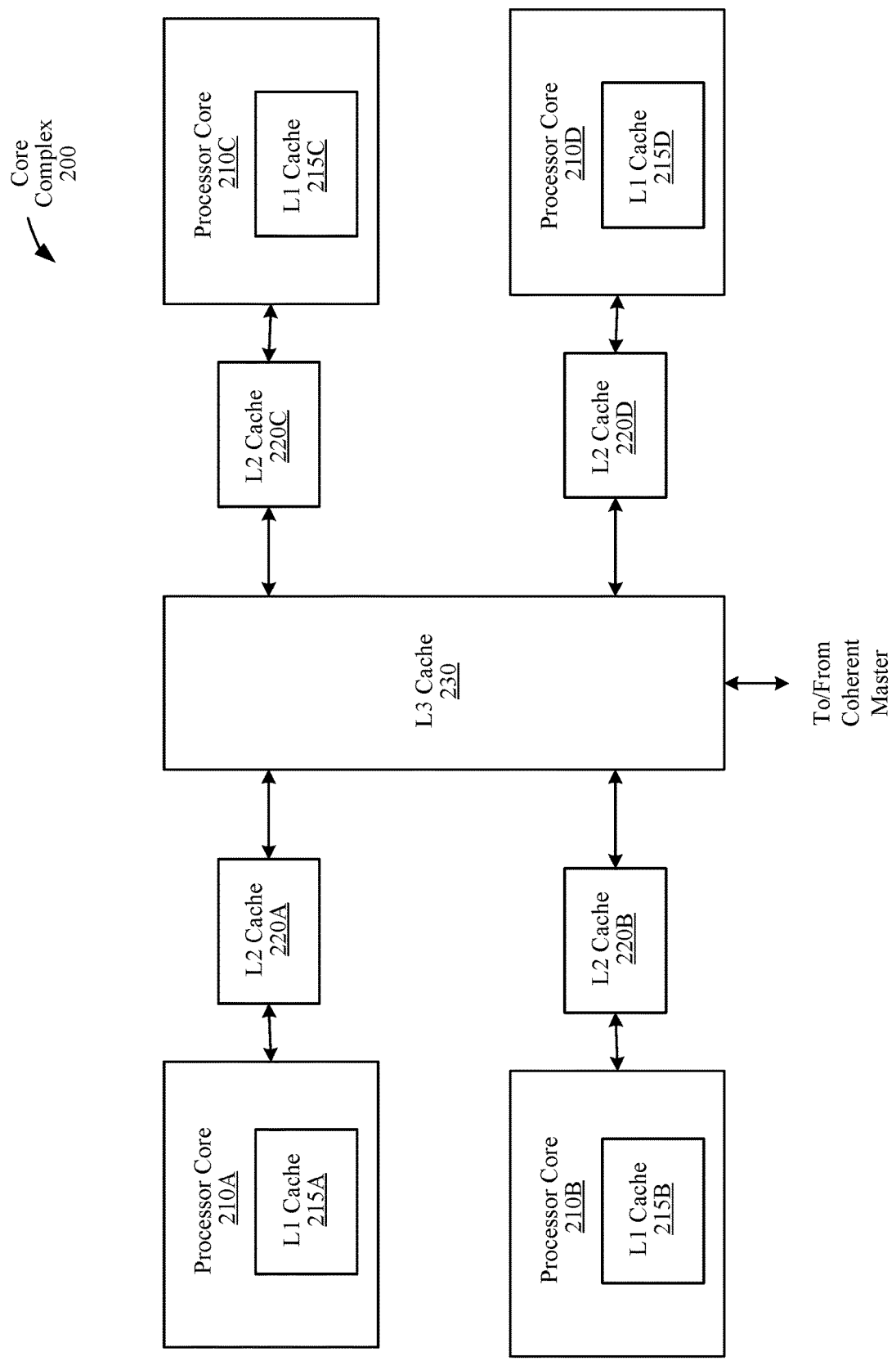
FIG. 2 is a block diagram of one implementation of a core complex.

FIG. 2 is a block diagram of one implementation of a core complex 200, for example, one of the core complexes 105A-N of FIG. 1. In one implementation, core complex 200 may include four processor cores 210A-D and a cache subsystem including L1 cache 215A-D, L2 cache 220A-D, and an L3 cache 230. The cache subsystem may include high-speed cache memories (e.g., L1 cache 215A-D, L2 cache 220A-D, and an L3 cache 230) configured to store blocks of data (not shown). As used herein, a "block" is a set of bytes stored in contiguous memory locations within the cache memories, which are treated as a unit for coherency purposes. Additionally, each of the terms "cache block", "block", "cache line", and "line" is interchangeable herein. In some implementations, a block can also be the unit of allocation and deallocation in a cache. A block may be retrieved from other caches within the system, such as from other core complexes (e.g., core complexes 105A-N of FIG. 1), or from the main memory, for example as may be retrieved through home node 130A of FIG. 1.

Additionally, in one implementation, the L3 cache 230 is shared by each of the processor cores 210A-D. L3 cache 230 is coupled to a coherent master for access to the data fabric (e.g., data fabric/bus 125 of FIG. 1) and memory subsystem (not shown). In other implementations, core complex 200 may include fewer or more processor cores (e.g., processor core 210A) and corresponding L2 caches (e.g., L2 cache 220A). In yet other implementations, core complex 200 may include other types of addressable cache subsystems that may include different numbers, types, and levels of cache memories without departing from the scope of this disclosure.

Figure 3:
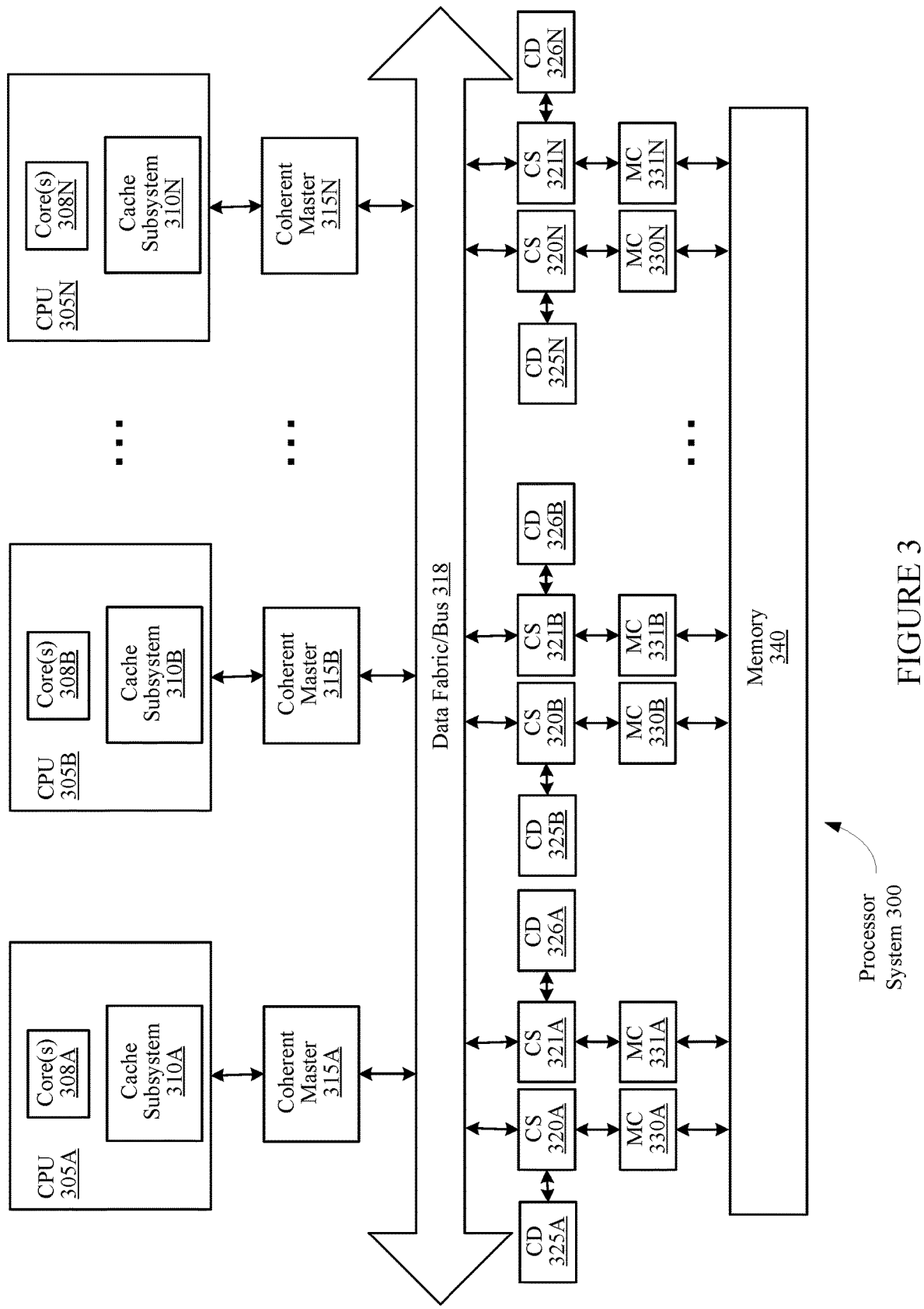
FIG. 3 is a block diagram of one implementation of a multi-CPU processor system.

FIG. 3 is a block diagram of one implementation of a processor system 300. In one implementation, processor system 300 includes multiple core complexes as illustrated by CPUs 305A-N. In various implementations, the number of CPUs (e.g., CPU 305A) and number of cores (e.g., cores 308A-N) per CPU may vary according to design choice. Each CPU 305A-N also includes a corresponding one of the cache subsystems 310A-N. In various implementations, the cache subsystems 310A-N may vary in size and structure as described above with reference to FIG. 2.

In one implementation, each CPU 305A-N is connected to a corresponding coherent master 315A-N that is further connected to a data fabric/bus 318. As used herein, a "coherent master" is defined as an agent including circuit components that process traffic flowing over an interconnect (e.g., data fabric/bus 318) and manages cache coherency, which includes each coherent master (e.g., coherent masters 315A-N) working in concert to generate, receive, and process coherency-related messages and probes for synchronizing copies of shared cache data within processor system 300.

In various implementations, each CPU 305A-N may be connected to one or more coherent slaves by a corresponding coherent master 315A-N and data fabric/bus 318. For example, CPU 305A may be connected to multiple coherent slaves that have access to each other's cache directories, such as, coherent slave (CS) 320A-D and coherent slave 321A-D, each connected through coherent master 315A and data fabric/bus 318. Coherent slave 320A is connected to memory controller (MC) 330A and cache directory (CD) 325A, while coherent slave 321A is coupled to memory controller 331A and cache directory 326A. Each memory controller 330A-N and 331A-N is connected to a respective one of the memory devices 340. One of the functions of each memory controller, such as memory controller 330A, is to provide the elements of the processor system 300 access to the memory devices 340. In various implementations, although shown as one block, the memory devices 340 may be a composed of one or more physical memories and may be of any type suitable for storing data, such as Dynamic Random Access Memory (DRAM), Static Random Access Memory (SRAM), etc.

In one implementation, each cache directory (e.g., cache directory 325A) includes one or more entries, and each entry corresponds to a region in the memory 340. Each entry includes information to track cached data within the processor system 300 that corresponds to the data within the region in the memory 340. The region size, sometimes called page size, may be defined by a block of addresses in the memory 340, in which addresses may vary among implementations depending on how the memory is organized (e.g., whether the memory is interleaved or not across channels and the memory address map base). In one implementation, one or more fields of an entry are configurable to change the page size of the region in the memory 340 that is being tracked by the cache directory.

In one implementation, the memory in devices 340 is divided up among each of the memory controllers 330A-N and 331A-N equally and each coherent slave (e.g., coherent slaves 320A-N and 321A-N) and their respective cache directories (e.g., cache directories 325A-N and 326A-N) manage a respective equal and contiguous portion of the memory. Alternatively, some or all of the memory devices 340 have differing memory capacities. In various implementations, a coherent slave may have access to one or more other coherent slave's cache directories. For example, coherent slave 320A may have access to multiple other cache directories within the processor system 300, such as 326A-N and 325B-N.

In one implementation, the coherent slaves 320A-N and 321A-N are each coupled with respective cache directories 325A-N and 326A-N, which serve as probe filters. When the coherent slave 320A receives a memory request targeting its corresponding memory controller 330A, the coherent slave 320A performs a lookup in its corresponding cache directory 325A to determine if the request targets data in a memory location encompassed within a region of the memory 340 tracked by an entry in the cache directory 325A, and whether the memory request results in a cache hit, meaning that the requested data can be found in the cache lines stored in the cache subsystem 310A-N associated with the region. In one implementation, if the lookup results in a hit, then the coherent slave 320A sends a probe to the CPU(s) (e.g., CPUs 305A-N) which are identified in the hit entry in the cache directory. The type of probe that is generated by the coherent slave 320A depends on the coherency state specified by the hit entry.

Although not shown in FIG. 3, in other implementations there may be other connections from data fabric/bus 318 to other components not shown to avoid obscuring the figure. For example, in another implementation, data fabric/bus 318 includes connections to one or more I/O interfaces and one or more I/O devices, such as shown in FIG. 1.

Figure 4:
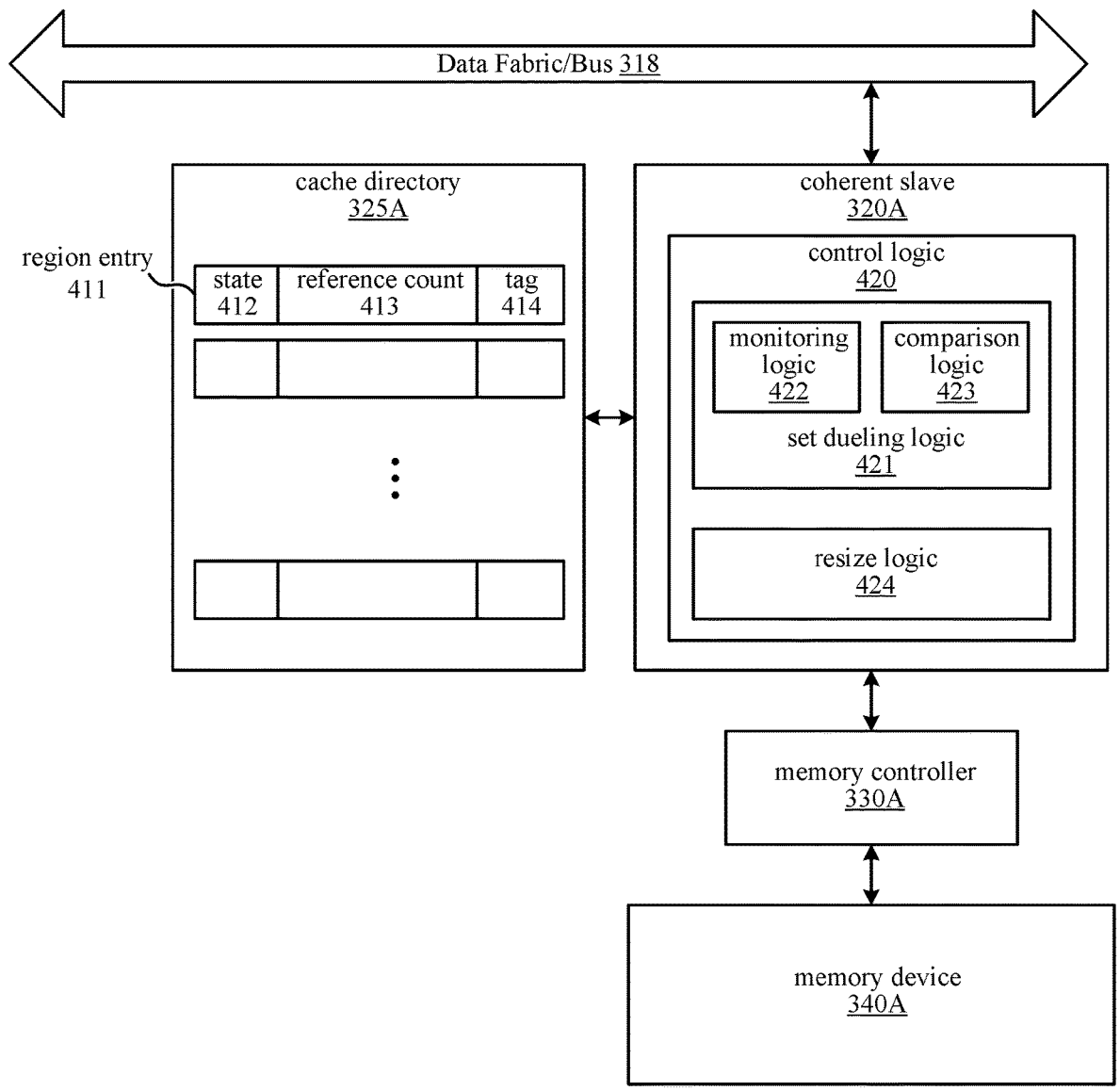
FIG. 4 is a block diagram of a portion of a processor system, according to an implementation.

FIG. 4 illustrates a portion of the processor system 300, according to an implementation. The cache directory 325A is a region-based probe filter directory that includes a set of entries each identifying a region of memory in the memory device 340A. In one implementation, the region is a memory page. The region entry 411 identifies a region by its tag 414 (e.g., a subset of the common address bits of the lines in the region), an address range, etc. and associates the region with a coherency state 412. The coherency state field 412 stores values indicating the coherency state of the associated region, such as clean, dirty or modified, and exclusive or shared. Each entry in the region probe filter directory 325A may also include additional metadata for the identified regions, such as valid bits, a reference count (e.g., the ARC) 413 of the number of cache lines of the region which are cached somewhere in the processor system, etc.

A controller device such as the coherent slave 320A includes control logic 420 that, together with the cache directory 325A, performs coherency actions by transmitting probes in response to memory access requests depending on whether the requested lines are cached, and depending on the coherency states and cached locations of the requested lines, as indicated by the cache directory 325A. The coherent slave 320A also includes control logic 420, which monitors one or more workload sparsity metrics (e.g., eviction to lookup ratio), compares the metrics to thresholds, and resizes the region size tracked per entry of the cache directory 325A in response to changes detected in the workload sparsity.

In one implementation, the control logic 420 monitors the number of lookups and evictions in the cache directory 325A and, when the eviction rate is high (which tends to happen with sparse workloads), then the control logic 420 increases the size of the region tracked per entry in the cache directory 325A. For example, a cache directory tracking a 1 kilobyte (kb) page with each entry can be reconfigured to track a 2 kb page for each entry. The same workload is more likely to perform as if it were less sparse when the region size is increased, since a larger region is more likely to contain more of the memory accesses of the workload.

In one implementation, a set dueling mechanism is used to determine the region size tracked in the cache directory 325A. Set dueling is managed by the set dueling logic 421, which maintains the locations of multiple sampling regions in the memory 340A, having different sizes. For example, the sampling regions may have sizes of 1 kb, 2 kb, and 4 kb. Each sampling region includes a number of lines, which are not necessarily contiguous in physical memory.

The monitoring logic 422 monitors operational metrics for each sampling region as their lines are accessed by the core complexes executing the workload. In one implementation, the monitoring logic 422 separately tracks the number of lookups (the region's entry is looked up in the cache directory) and evictions (the region's entry is evicted from the cache directory) occurring for the sampling regions of each region size, so that the region size that is performing optimally for the workload can be identified. The monitoring logic 422 calculates a ratio between evictions of entries from the cache directory and lookups performed in the cache directory. In one implementation, the number of lookups includes all lookups performed in the cache directory. In an alternative implementation, the number of lookups includes only lookups performed for certain types of operations (e.g., cacheable load and store operations). The calculated ratio serves as a workload sparsity metric that reflects the sparsity of the workload being executed. That is, the eviction to lookup ratio increases and decreases in in response to increases and decreases, respectively, in workload sparsity. If a large proportion of lookups in the cache directory 325A result in evictions to free space for new entries, then the cache directory 325A is running out of capacity.

In one implementation, the comparison logic 423 compares the eviction to lookup ratio obtained from the sampling regions for each region size (e.g., 1 kb, 2 kb, and 4 kb) and compares it with a threshold. The set dueling logic 421 then selects the smallest region size that does not exceed the threshold. Since the number of evictions of entries from the cache directory 325A increases correspondingly with an increase in workload sparsity, an excessive number of evictions measured for a particular region size (e.g., as indicated by an eviction to lookup ratio that exceeds the threshold) means that the cache directory 325A is running out of capacity and the region size is too small for the sparsity of the workload. The region size tracked per entry in the cache directory 325A is changed by the resize logic 424 to the region size selected by the set dueling logic 421. After resizing, the same amount of lines can be tracked with fewer entries in the cache directory 325A, conserving capacity.

When the sparsity of the workload decreases, the eviction to lookup ratio also decreases. If the ratio decreases below a threshold, this indicates that there is sufficient capacity in the cache directory 325A to store more entries so that cache lines can be tracked more accurately (e.g., with less false sharing), by using a smaller region size. For example, while the cache directory 325A is operating with a region size of 2 kb and the eviction to lookup ratio of the 1 kb sampling region or regions decreases below a threshold, then the 1 kb region size is now the smallest region size for which the corresponding workload sparsity metric does not exceed the threshold. The set dueling logic 421 then signals the resize logic 424 to change the tracked region size of the cache directory 325A to the 1 kb region size.

In one embodiment, resize logic 424 reconfigures the cache directory 325A to change the region size and thus the number of cache lines tracked per entry by interchanging at least one bit between a tag field and a reference count field adjacent to the tag field of each entry in cache directory 325A. When the region size is increased, there are fewer regions and the tag field is able to identify a given region with a smaller number of bits. Each region includes a larger number of lines, so the reference count field tracks the number of cached lines from the region using a greater number of bits. Moving one bit per resize operation increases or decreases the region size by a factor of two. By this method, the region size tracked per entry can be resized in steps; for example, the region size can be increased from 1 kb to 2 kb, or from 2 kb to 4 kb by moving one bit from the tag field to the reference count field. The region size can be decreased from 4 kb to 2 kb or from 2 kb to 1 kb by moving one bit from the reference count field to the tag field. In one implementation, the resize logic 424 changes the tracked region size by writing a region size value in a register. When the cache directory 325A is accessed, the reference count 413 and tag 414 fields are interpreted based on the stored region size value.

Figure 5:
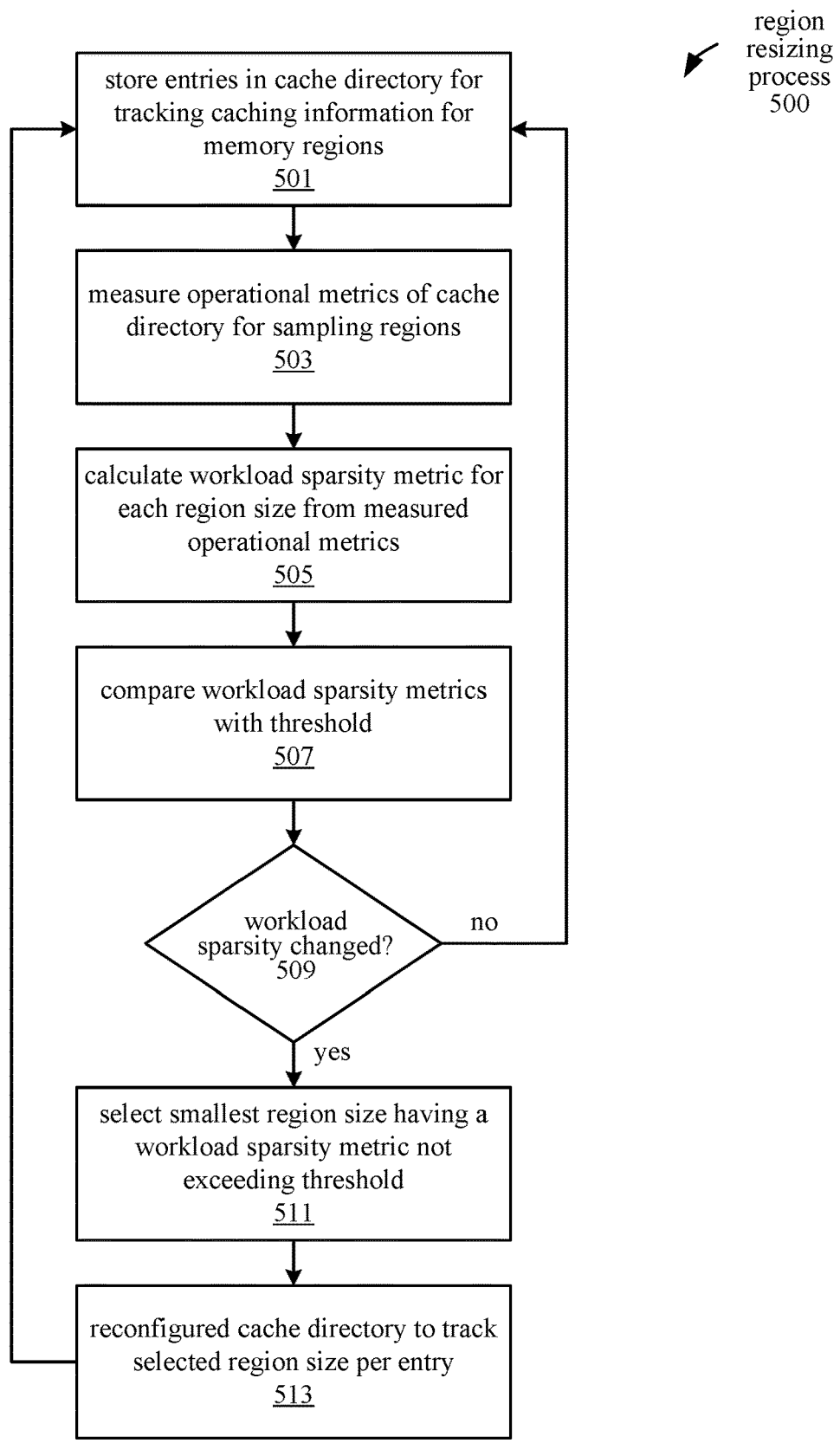
FIG. 5 is a flow diagram illustrating one implementation of a process for changing the region size tracked per entry in a cache directory.

FIG. 5 is a flow diagram illustrating a process 500 for dynamically resizing the region size tracked per entry in a cache directory 325A during execution of a workload, and in response to changes in workload sparsity, according to an implementation. The resizing process 500 is performed by components of the processor system 300, including the cache directory 325A and coherent slave 320A.

At block 501, the cache directory 325A stores entries for tracking caching information (e.g., coherency state, etc.) for memory regions in the memory device 340A. As an example, each entry in the cache directory 325A tracks lines within a memory region having a size of 1 kb. At block 503, the monitoring logic 422 measures one or more operational metrics of the cache directory 325A for each of the sampling regions (e.g., the 1 kb, 2 kb, and 4 kb sampling regions) during execution of the workload. In one implementation, the workload sparsity metric is a ratio between the number of evictions of entries from the cache directory 325A and the number of lookups performed in the cache directory 325A.

At block 507, the workload sparsity metrics measured for each of the different sampling region sizes are compared with one or more threshold values in the comparison logic 423. For example, the comparison logic 423 determines whether the respective workload sparsity metrics for the 1 kb, 2 kb, and 4 kb sampling regions has exceeded the threshold. At block 509, a change in workload sparsity is detected if a new threshold is exceeded that was not exceeded in the most recent comparison, or if a threshold that was previously exceeded is no longer exceeded. For example, if the eviction to lookup ratio for the 1 kb region size begins to exceed the threshold, then this indicates an increase in the workload sparsity at block 509. If the workload sparsity did not change, then the process 500 returns to block 501, where the cache directory 325A continues to store entries and the set dueling logic 421 continues to monitor the sampling regions until the workload sparsity changes.

When the workload sparsity changes (e.g., a new threshold was exceeded or a previously exceed threshold is no longer exceeded), then the process 500 continues from block 509 to block 511. At block 511, the set dueling logic 421 selects a new region size corresponding to one of the sampling region sizes. In one implementation, the set dueling logic 421 selects the region size of the smallest sampling region with an eviction to lookup ratio that is less than the threshold. Continuing the previous example, if the threshold is exceeded for the 1 kb sampling region and is not exceeded for the 2 kb or 4 kb sampling regions, then the 2 kb region size is selected. Alternatively, if the threshold is exceeded for the 1 kb and 2 kb sampling regions and is not exceeded for the 4 kb sampling region, then the 4 kb region size is selected.

At block 513, the set dueling logic 421 indicates the selected new region size to the resize logic 424, which reconfigures the cache directory 325A to a new configuration that uses the new region size. In one implementation, the resize logic 424 reconfigures the cache directory 325A for the new region size by writing a region size value into a register that indicates the new region size. The region size value indicates the boundary between the tag field 414 and the reference count field 413. Continuing the previous example, changing the region size from 1 kb to 2 kb entails reassigning one bit from the tag field 414 to the reference count field 413. Changing the region size from 1 kb to 4 kb entails reassigning two bits from the tag field 414 to the reference count field 413. From block 513, the process 500 returns to block 501 to continue operation of the cache directory 325A using the new region size. Blocks 501-513 repeat to dynamically change the tracked region size in the cache directory 325A to an optimal region size in response to further changes in workload sparsity. For example, if the region size of the cache directory is now 2 kb and the workload sparsity increases again such that the eviction to lookup ratio for the 2 kb region size increases above the threshold, then the region size is increased again to 4 kb.

The region size can also be decreased via process 500 when the workload sparsity decreases. At block 509, if a previously exceeded threshold is no longer exceeded (i.e., the workload sparsity metric for one of the sampled region sizes is now less than the threshold), then the workload sparsity has decreased and the process 500 continues at block 511. For example, if the tracked region size is 2 kb and the eviction to lookup ratio for the 1 kb region size decreases below the threshold, then the 1 kb region size is selected according to block 511. At block 513, the resize logic 424 decreases the tracked region size from 2 kb to 1 kb.

While the above described implementations utilize a set dueling mechanism that monitors operating metrics for three different region sizes to determine an optimal region size, alternative implementations of the set dueling mechanism monitor operating metrics for fewer or more than three region sizes. Other implementations do not use set dueling and may monitor operating metrics for one region size (e.g., the current region size tracked by the cache directory 325A). In alternative implementations, the workload sparsity can be determined from a pattern of memory accesses, messages from other devices, or other signals instead of the eviction to lookup ratio.

A method includes, in a cache directory, storing a set of entries corresponding to one or more memory regions having a first region size when the cache directory is in a first configuration, and based on a workload sparsity metric, reconfiguring the cache directory to a second configuration. In the second configuration, each entry in the set of entries corresponds to a memory region having a second region size.

The method further includes selecting as the second region size a region size corresponding to one of a plurality of sampling regions. The workload sparsity metric is based on one of a plurality of operational metrics each measured during execution of a workload for one of the plurality of sampling regions, and each of the plurality of sampling regions has a different size.

The method also includes selecting as the second region size a region size of a first sampling region of the plurality of sampling regions. The first sampling region is a smallest sampling region of the plurality of sampling regions with an operational metric that is less than a threshold.

The method also includes, based on the workload sparsity metric, reconfiguring the cache directory to a third configuration. In the third configuration, each entry in the set of entries corresponds to a memory region having a third region size. The second region size is twice the size of the first region size, and the third region size is twice the size of the second region size.

In the method, reconfiguring the cache directory to the second configuration includes storing a region size value in a register to interchange at least one bit between a first field in the cache directory and a second field in the cache directory.

In the method, the workload sparsity metric includes a ratio between evictions of entries from the cache directory and lookups performed in the cache directory.

The method also includes, in response to the workload sparsity metric indicating a number of evictions per lookup that exceeds a threshold, selecting a second region size that is larger than the first region size.

The method also includes, in response to the workload sparsity metric indicating that a number of evictions per lookup is less than a threshold, selecting a second region size that is smaller than the first region size.

A device includes a cache directory to store a set of entries corresponding to one or more memory regions having a first region size when the cache directory is in a first configuration, and control logic coupled with the cache directory to, based on a workload sparsity metric, reconfigure the cache directory to a second configuration. In the second configuration, each entry in the set of entries corresponds to a memory region having a second region size.

In the device, the control logic also includes set dueling logic to select as the second region size a region size corresponding to one of a plurality of sampling regions. The workload sparsity metric is based on one of a plurality of operational metrics each measured during execution of a workload for one of the plurality of sampling regions. Each of the plurality of sampling regions has a different size.

In the device, the set dueling logic further selects as the second region size a region size of a first sampling region of the plurality of sampling regions, based on determining that the first sampling region is a smallest sampling region of the plurality of sampling regions with an operational metric that is less than a threshold.

In the device, the control logic further, based on the workload sparsity metric, reconfigures the cache directory to a third configuration. In the third configuration, each entry in the set of entries corresponds to a memory region having a third region size. The second region size is twice the size of the first region size, and the third region size is twice the size of the second region size.

In the device, the control logic reconfigures the cache directory to the second configuration by storing a region size value in a register to interchange at least one bit between a first field in the cache directory and a second field in the cache directory.

The device also includes monitoring logic coupled with the cache directory to calculate the workload sparsity metric based on a ratio between evictions of entries from the cache directory and lookups performed in the cache directory.

In the device, the control logic further, in response to the workload sparsity metric indicating a number of evictions per lookup that exceeds a threshold, selects a second region size that is larger than the first region size.

In the device, the control logic further, in response to the workload sparsity metric indicating that a number of evictions per lookup is less than a threshold, selects a second region size that is smaller than the first region size.

A computing system includes a set of one or more processor core complexes to cache lines from one or more memory regions, and a controller device coupled with the set of processor core complexes to, in a cache directory, store a set of entries corresponding to the one or more memory regions and having a first region size when the cache directory is in a first configuration, and based on a workload sparsity metric, reconfigure the cache directory to a second configuration. In the second configuration, each entry in the set of entries corresponds to a memory region having a second region size.

In the computing system, the controller device also includes set dueling logic to select as the second region size a region size of a first sampling region of the plurality of sampling regions, based on determining that the first sampling region is a smallest sampling region of the plurality of sampling regions with an operational metric that is less than a threshold. The workload sparsity metric is one of a plurality of operational metrics each measured during execution of a workload for one of the plurality of sampling regions, and each of the plurality of sampling regions has a different size.

In the computing system, the controller device reconfigures the cache directory to the second configuration by storing a region size value in a register to interchange at least one bit between a first field in the cache directory and a second field in the cache directory.

In the computing system, the controller device also includes monitoring logic coupled with the cache directory to calculate the workload sparsity metric based on a ratio between evictions of entries from the cache directory and lookups performed in the cache directory. The controller device further, in response to the workload sparsity metric indicating a number of evictions per lookup that exceeds a first threshold, selects a second region size that is larger than the first region size, and in response to the workload sparsity metric indicating that a number of evictions per lookup is less than a second threshold, selects a second region size that is smaller than the first region size.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain implementations may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some implementations may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another implementation, instructions or sub-operations of distinct operations may be in an intermittent and/or alternating manner.

In the foregoing specification, the implementations have been described with reference to specific exemplary implementations thereof. It will, however, be evident that various modifications and changes may be made thereto without departing from the broader scope of the implementations as set forth in the appended claims. The specification and drawings are, accordingly, to be regarded in an illustrative sense rather than a restrictive sense.

The invention claimed is:

1. A method, comprising:
in a cache directory, storing a set of entries each corresponding to one or more memory regions having a first region size when the cache directory is in a first configuration; and
based on a workload sparsity metric, reconfiguring the cache directory to a second configuration, wherein:
in the second configuration, each entry in the set of entries corresponds to a memory region having a second region size; and
the workload sparsity metric is based on an operational metric of a plurality of operational metrics each measured during execution of a workload for a sampling region of a plurality of sampling regions.

2. The method of claim 1, further comprising:
selecting as the second region size a region size corresponding to one of the plurality of sampling regions, wherein
each of the plurality of sampling regions has a different size.

3. The method of claim 2, further comprising:
selecting as the second region size a region size of a first sampling region of the plurality of sampling regions, wherein the first sampling region is a smallest sampling region of the plurality of sampling regions with an operational metric that is less than a threshold.

4. The method of claim 1, further comprising:
based on the workload sparsity metric, reconfiguring the cache directory to a third configuration, wherein in the third configuration, each entry in the set of entries corresponds to a memory region having a third region size, wherein:
the second region size is twice the size of the first region size, and
the third region size is twice the size of the second region size.

5. The method of claim 1, wherein reconfiguring the cache directory to the second configuration comprises:
storing a region size value in a register to interchange at least one bit between a first field in the cache directory and a second field in the cache directory.

6. The method of claim 1, wherein:
the workload sparsity metric comprises a ratio between evictions of entries from the cache directory and lookups performed in the cache directory.

7. The method of claim 6, further comprising:
in response to the workload sparsity metric indicating a number of evictions per lookup that exceeds a threshold, selecting a second region size that is larger than the first region size.

8. The method of claim 6, further comprising:
in response to the workload sparsity metric indicating that a number of evictions per lookup is less than a threshold, selecting a second region size that is smaller than the first region size.

9. A device, comprising:
a cache directory configured to store a set of entries each corresponding to one or more memory regions having a first region size when the cache directory is in a first configuration; and
control logic coupled with the cache directory and configured to, based on a workload sparsity metric, reconfigure the cache directory to a second configuration, wherein:
in the second configuration, each entry in the set of entries corresponds to a memory region having a second region size; and
the workload sparsity metric is based on an operational metric of a plurality of operational metrics each measured during execution of a workload for a sampling region of a plurality of sampling regions.

10. The device of claim 9, wherein the control logic further comprises set dueling logic configured to:
select as the second region size a region size corresponding to one of the plurality of sampling regions, wherein
each of the plurality of sampling regions has a different size.

11. The device of claim 10, wherein the set dueling logic is further configured to:
select as the second region size a region size of a first sampling region of the plurality of sampling regions, based on determining that the first sampling region is a smallest sampling region of the plurality of sampling regions with an operational metric that is less than a threshold.

12. The device of claim 9, wherein the control logic is further configured to:
based on the workload sparsity metric, reconfigure the cache directory to a third configuration, wherein in the third configuration, each entry in the set of entries corresponds to a memory region having a third region size, wherein:
the second region size is twice the size of the first region size, and
the third region size is twice the size of the second region size.

13. The device of claim 9, wherein the control logic is configured to reconfigure the cache directory to the second configuration by:
storing a region size value in a register to interchange at least one bit between a first field in the cache directory and a second field in the cache directory.

14. The device of claim 9, further comprising:
monitoring logic coupled with the cache directory and configured to calculate the workload sparsity metric based on a ratio between evictions of entries from the cache directory and lookups performed in the cache directory.

15. The device of claim 14, wherein the control logic is further configured to:
in response to the workload sparsity metric indicating a number of evictions per lookup that exceeds a threshold, select a second region size that is larger than the first region size.

16. The device of claim 14, wherein the control logic is further configured to:
in response to the workload sparsity metric indicating that a number of evictions per lookup is less than a threshold, select a second region size that is smaller than the first region size.

17. A computing system, comprising:
a set of one or more processor core complexes configured to cache lines from one or more memory regions; and
a controller device coupled with the set of processor core complexes and configured to:
in a cache directory, store a set of entries corresponding to the one or more memory regions, each of the one or more memory regions having a first region size when the cache directory is in a first configuration; and
based on a workload sparsity metric, reconfigure the cache directory to a second configuration, wherein:
in the second configuration, each entry in the set of entries corresponds to a memory region having a second region size; and
the workload sparsity metric is based on an operational metric of a plurality of operational metrics each measured during execution of a workload for a sampling region of a plurality of sampling regions.

18. The computing system of claim 17, wherein the controller device further comprises set dueling logic configured to:
select as the second region size a region size of a first sampling region of the plurality of sampling regions, based on determining that the first sampling region is a smallest sampling region of the plurality of sampling regions with an operational metric that is less than a threshold, wherein
each of the plurality of sampling regions has a different size.

19. The computing system of claim 17, wherein the controller device is configured to reconfigure the cache directory to the second configuration by:
storing a region size value in a register to interchange at least one bit between a first field in the cache directory and a second field in the cache directory.

20. The computing system of claim 17, wherein:
the controller device further comprises monitoring logic coupled with the cache directory and configured to calculate the workload sparsity metric based on a ratio between evictions of entries from the cache directory and lookups performed in the cache directory, and
the controller device is further configured to:
in response to the workload sparsity metric indicating a number of evictions per lookup that exceeds a first threshold, select a second region size that is larger than the first region size, and
in response to the workload sparsity metric indicating that a number of evictions per lookup is less than a second threshold, select a second region size that is smaller than the first region size.

* * * * *